US008982396B2

(12) United States Patent
Kaneko

(10) Patent No.: US 8,982,396 B2
(45) Date of Patent: Mar. 17, 2015

(54) IMAGE FORMING APPARATUS FOR DISPLAYING A TALLY WINDOW OF PRINT HISTORIES, CONTROL METHOD THEREFOR, PRINTING SYSTEM, AND NON-TRANSITORY COMPUTER-READABLE MEDIUM

(71) Applicant: Canon Kabushiki Kaisha, Tokyo (JP)

(72) Inventor: Shuhei Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/032,631

(22) Filed: Sep. 20, 2013

(65) Prior Publication Data

US 2014/0098400 A1 Apr. 10, 2014

(30) Foreign Application Priority Data

Oct. 4, 2012 (JP) .................................. 2012-222542

(51) Int. Cl.
*G06F 3/12* (2006.01)
*G06K 15/00* (2006.01)
*G03G 15/00* (2006.01)

(52) U.S. Cl.
CPC ................ *G06K 15/40* (2013.01); *G03G 15/50* (2013.01)
USPC ....................................... 358/1.15; 358/1.14

(58) Field of Classification Search
CPC .............................. G03G 15/50; G06K 15/40
USPC ................................................. 358/1.14–1.15
See application file for complete search history.

(56) References Cited

U.S. PATENT DOCUMENTS

| 6,313,921 | B1 * | 11/2001 | Kadowaki | 358/1.15 |
|---|---|---|---|---|
| 8,711,385 | B2 * | 4/2014 | Tsujimoto | 358/1.14 |
| 2002/0048036 | A1 * | 4/2002 | Nakagawa et al. | 358/1.14 |
| 2003/0182368 | A1 * | 9/2003 | Horiyama | 709/203 |
| 2005/0275868 | A1 * | 12/2005 | Higashiura et al. | 358/1.14 |
| 2007/0083679 | A1 * | 4/2007 | Kikuchi | 710/8 |
| 2008/0137134 | A1 * | 6/2008 | Igarashi | 358/1.15 |
| 2008/0144099 | A1 * | 6/2008 | Hagiwara | 358/1.15 |
| 2008/0186530 | A1 * | 8/2008 | Kurozasa | 358/1.15 |
| 2008/0246993 | A1 * | 10/2008 | Murakami et al. | 358/1.15 |

(Continued)

FOREIGN PATENT DOCUMENTS

| JP | 2003-266892 A | 9/2003 |
| JP | 2010-170556 A | 8/2010 |

*Primary Examiner* — Benny Q Tieu
*Assistant Examiner* — Quyen V Ngo
(74) *Attorney, Agent, or Firm* — Carter DeLuca, Farrell & Schmidt, LLP

(57) ABSTRACT

An image forming apparatus for displaying a tally window of print histories, comprises: a tally unit which tallies the print histories; a receiving unit which receives a condition used to determine whether to display the tally window, and a setting corresponding to the condition and used to generate the tally window; a determination unit which determines, based on a total result by the tally unit and the condition received by the receiving unit, whether to display the tally window; a generation unit which, if the determination unit determines that the tally window is to be displayed because the condition received by the receiving unit is satisfied, generates the tally window using the setting corresponding to the condition; and a display unit which displays the tally window generated by the generation unit.

11 Claims, 17 Drawing Sheets

(56) References Cited

U.S. PATENT DOCUMENTS

| | | | |
|---|---|---|---|
| 2009/0284780 A1* | 11/2009 | Kitora et al. | 358/1.13 |
| 2009/0307195 A1* | 12/2009 | Anno | 707/3 |
| 2010/0231965 A1* | 9/2010 | Sunata | 358/1.15 |
| 2011/0188073 A1* | 8/2011 | Akutsu | 358/1.15 |
| 2012/0072586 A1* | 3/2012 | Kurahashi | 709/224 |

* cited by examiner

FIG. 6A

| USER NAME | TALLY WINDOW DISPLAY FLAG | DISPLAY DETERMINATION ID | UPDATE DATE/ TIME | COLOR PAGE | MONOCHROME PAGE |
|---|---|---|---|---|---|
| UserA | 0 | | | 10 | 60 |
| UserB | 1 | 0001 | 2012/01/14 10:04:06 | 100 | 20 |
| UserC | 0 | | | 20 | 5 |
| UserD | 0 | | | 10 | 10 |
| UserE | 1 | | | 5 | 0 |
| ... | ... | ... | ... | ... | ... |

| DISPLAY DETERMINATION ID | DISPLAY DETERMINATION EXECUTION FLAG | DISPLAY CONDITION | DISPLAY MESSAGE | DISPLAY PRIORITY ORDER | DISPLAY STYLE |
|---|---|---|---|---|---|
| 0001 | 1 | WHEN LAST PRINTING IS COLOR PRINTING | PLEASE REFRAIN FROM COLOR PRINTING AS MUCH AS POSSIBLE | 1 | TOTAL VALUE EMPHASIS |
| 0002 | 0 | WHEN LAST PRINTING IS SINGLE-SIDED PRINTING | PLEASE USE DOUBLE-SIDED SETTING | 5 | TOTAL VALUE EMPHASIS |
| 0003 | 0 | WHEN NUMBER OF COLOR-PRINTED SHEETS IN ONE DAY EXCEEDS 10 | PLEASE REDUCE NUMBER OF COLOR-PRINTED SHEETS TO 10 OR LESS | 2 | GRAPH |
| ... | | | | | ... |

| USER NAME | GROUP NAME |
|---|---|
| UserA | GroupA |
| UserB | GroupB |
| UserC | GroupC |
| UserD | GroupA |
| UserE | GroupB |

FIG. 7B

| GROUP | Member | | | |
|---|---|---|---|---|
| GroupA | UserA | UserD | | ... |
| GroupB | UserB | UserE | | ... |
| GroupC | UserC | | | ... |
| GroupD | | | | ... |
| GroupE | | | | ... |

F I G. 10
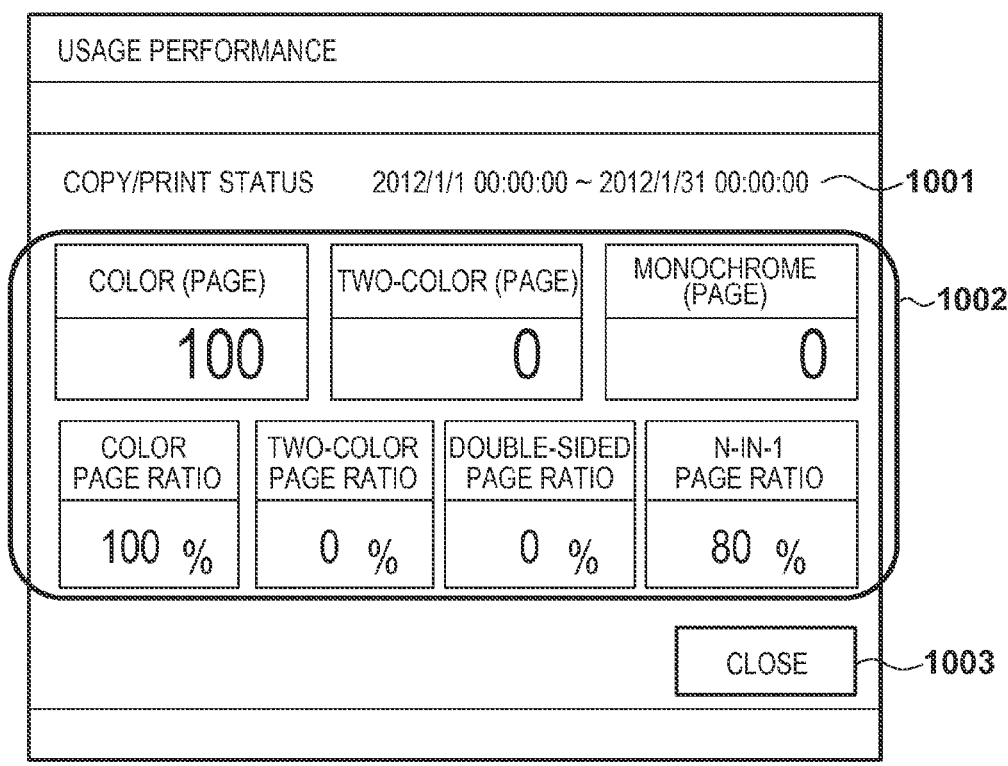

FIG. 17

| DISPLAY CONDITION | MESSAGE | PRIORITY ORDER | DISPLAY STYLE |
|---|---|---|---|
| ☐ WHEN LAST PRINTING IS COLOR PRINTING | PLEASE REFRAIN FROM COLOR PRINTING AS MUCH AS POSSIBLE | ▶ 1 | TOTAL VALUE EMPHASIS ▶ |
| ☐ WHEN LAST PRINTING IS SINGLE-SIDED PRINTING | PLEASE USE DOUBLE-SIDED SETTING | ▶ 5 | TOTAL VALUE EMPHASIS ▶ |
| ☐ WHEN NUMBER OF COLOR-PRINTED SHEETS IN ONE DAY EXCEEDS [10] | PLEASE REDUCE NUMBER OF COLOR-PRINTED SHEETS TO 10 OR LESS | ▶ 2 | GRAPH ▶ |
| ☐ WHEN NUMBER OF COLOR-PRINTED SHEETS EXCEEDS [80%] OF TARGET VALUE | NUMBER OF COLOR SHEETS OF THIS MONTH IS APPROACHING TARGET VALUE | ▶ 6 | GRAPH ▶ |
| ☐ TIME PERIOD * DURING WHICH NUMBER OF PRINTED SHEETS IS LARGE ACCORDING TO PAST PRINT HISTORIES IS DISPLAYED WHEN THIS TIME PERIOD IS INPUT | NUMBER OF PRINTED SHEETS TENDS TO BE LARGE DURING * | ▶ 3 | STATISTIC DISPLAY ▶ |
| ☐ DAY OF THE WEEK * WHEN NUMBER OF PRINTED SHEETS IS LARGE ACCORDING TO PAST PRINT HISTORIES IS DISPLAYED WHEN THIS DAY OF THE WEEK IS INPUT | NUMBER OF COLOR-PRINTED SHEETS TENDS TO BE LARGE ON * | ▶ 4 | STATISTIC DISPLAY ▶ |

☐ OUTPUT WARNING WINDOW IF TALLY WINDOW IS SUCCESSIVELY DISPLAYED [10] TIMES

F I G. 18
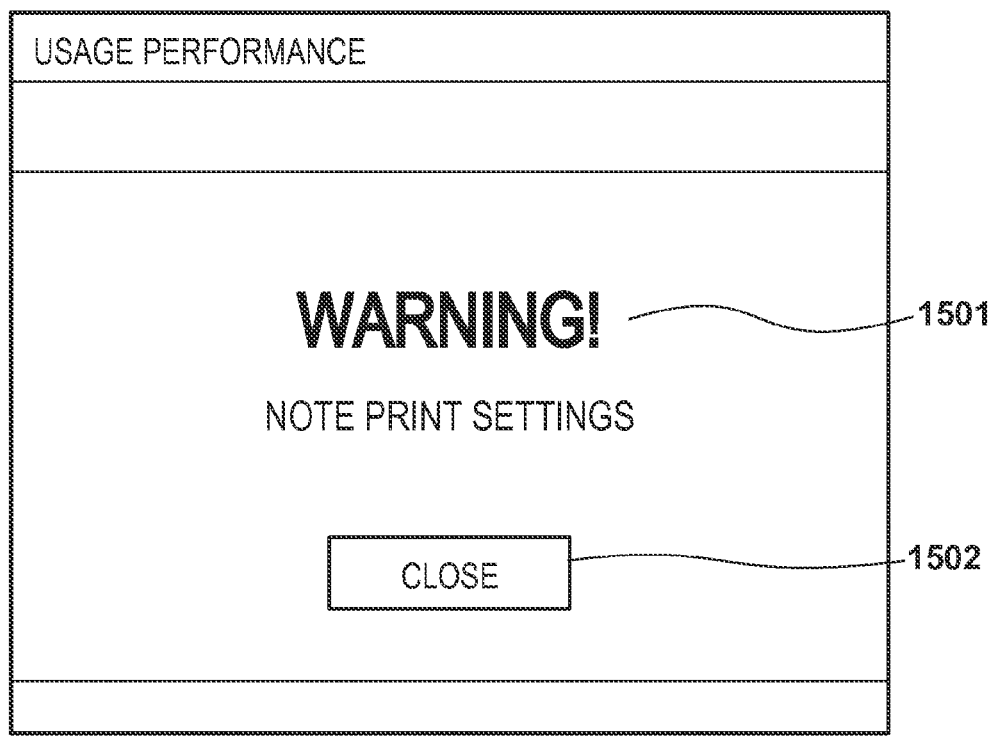

IMAGE FORMING APPARATUS FOR DISPLAYING A TALLY WINDOW OF PRINT HISTORIES, CONTROL METHOD THEREFOR, PRINTING SYSTEM, AND NON-TRANSITORY COMPUTER-READABLE MEDIUM

BACKGROUND OF THE INVENTION

1. Field of the Invention

The present invention relates to an image forming apparatus for presenting the total result of the usage performance of itself, a control method for the image forming apparatus, a printing system, and a non-transitory computer-readable medium.

2. Description of the Related Art

As the number of printed sheets increases, the cost of consumed sheets and toners rises. A business owner who introduces an image forming apparatus or the administrator of an image forming apparatus wants to reduce the use amount of sheets or toners to cut the TCO (Total Cost of Ownership).

In recent years, there has been known a technique of providing, for each user, on a local panel, the tally window of the number of output sheets for each setting (color/two-color/monochrome, single-sided/double-sided, double-sided page ratio/two-color page ratio/N-in-1 page ratio, or the like) or each user/group. The administrator can set a window display frequency (display in each login operation/display once per day). If the user can identify the use state such as the number of output sheets of the image forming apparatus, he/she can execute printing with printing suppression in mind by, for example, refraining from unnecessary printing or color printing, or often using double-sided printing or N-in-1 printing.

In Japanese Patent Laid-Open No. 2003-266892, a checkbox for setting whether to send a notification before a use upper limit value is exceeded, and a percentage input field for setting a percentage of the upper limit value above which a notification is sent are prepared, and are arbitrarily settable. Japanese Patent Laid-Open No. 2010-170556 discloses a technique of displaying data at a plurality of timings based on the ratio of a usage performance to the use upper limit value of the user or the ratio of the upper limit value to the usage performance of the image forming apparatus.

However, on a tally window displayed on the local panel of the image forming apparatus, the same items are displayed to all users at the same frequency since the administrator makes settings at once. If a total result window is periodically displayed, the user may skip over the tally window without considering the reason why the window is displayed. Furthermore, since a similar window is displayed regardless of settings, the user cannot recognize specific portions to pay attention in the tally window, and thus may not be reminded of printing suppression even though the tally window is displayed.

Therefore, an arrangement which allows the user to readily identify the reason why a window is displayed is required.

SUMMARY OF THE INVENTION

According to one aspect of the present invention, there is provided an image forming apparatus for displaying a tally window of print histories, comprising: a tally unit configured to tally the print histories; a receiving unit configured to receive a condition used to determine whether to display the tally window, and a setting corresponding to the condition and used to generate the tally window; a determination unit configured to determine, based on a total result by the tally unit and the condition received by the receiving unit, whether to display the tally window; a generation unit configured to, if the determination unit determines that the tally window is to be displayed because the condition received by the receiving unit is satisfied, generate the tally window using the setting corresponding to the condition; and a display unit configured to display the tally window generated by the generation unit.

According to another aspect of the present invention, there is provided a control method for an image forming apparatus which displays a tally window of print histories, comprising: a tally step of tallying the print histories; a receiving step of receiving a condition used to determine whether to display the tally window, and a setting corresponding to the condition and used to generate the tally window; a determination step of determining, based on a total result in the tally step and the condition received in the receiving step, whether to display the tally window; a generation step of, if it is determined in the determination step that the tally window is to be displayed because the condition received in the receiving step is satisfied, generating the tally window using the setting corresponding to the condition; and a display step of displaying the tally window generated in the generation step.

According to another aspect of the present invention, there is provided a non-transitory computer-readable medium storing a program for causing a computer to function as a tally unit configured to tally print histories, a receiving unit configured to receive a condition used to determine whether to display a tally window, and a setting corresponding to the condition and used to generate the tally window, a determination unit configured to determine, based on a total result by the tally unit and the condition received by the receiving unit, whether to display the tally window, a generation unit configured to, if the determination unit determines that the tally window is to be displayed because the condition received by the receiving unit is satisfied, generate the tally window using the setting corresponding to the condition, and a display unit configured to display the tally window generated by the generation unit.

According to another aspect of the present invention, there is provided a printing system including an image forming apparatus and a tally server, the tally server comprising a tally unit configured to tally print histories in the image forming apparatus, and the image forming apparatus comprising a receiving unit configured to receive a plurality of conditions each used to determine whether to display a tally window, priority orders of the plurality of conditions, and settings respectively corresponding to the plurality of conditions and each used to generate the tally window, an acquisition unit configured to acquire a total result of the print histories from the tally server, a determination unit configured to determine, based on the total result acquired by the acquisition unit and the plurality of conditions received by the receiving unit, whether to display the tally window, a generation unit configured to, if the determination unit determines that a plurality of tally windows are to be displayed because the plurality of received conditions are satisfied, generate the plurality of tally windows using the settings respectively corresponding to the plurality of conditions, and a display unit configured to display the plurality of tally windows generated by the generation unit according to the priority orders.

According to the present invention, the user can readily identify the reason why a tally window is displayed, and thus it is possible to provide more effective information to the user.

Further features of the present invention will become apparent from the following description of exemplary embodiments (with reference to the attached drawings).

BRIEF DESCRIPTION OF THE DRAWINGS

FIGS. 6A and 6B are tables respectively showing examples of a total result management table and window display information management table according to the first embodiment;

FIGS. 7A and 7B are tables respectively showing examples of a user information management table and group information management table according to the first embodiment;

FIG. 10 is a view showing an example of a tally window (default) according to the first embodiment;

FIG. 17 is a view showing an example of a setting window 1400 according to the second embodiment;

FIG. 18 is a view showing an example of a warning window according to the second embodiment.

DESCRIPTION OF THE EMBODIMENTS

Modes for carrying out the present invention will be described below with reference to the accompanying drawings.

First Embodiment

[System Arrangement]

Figure 1:
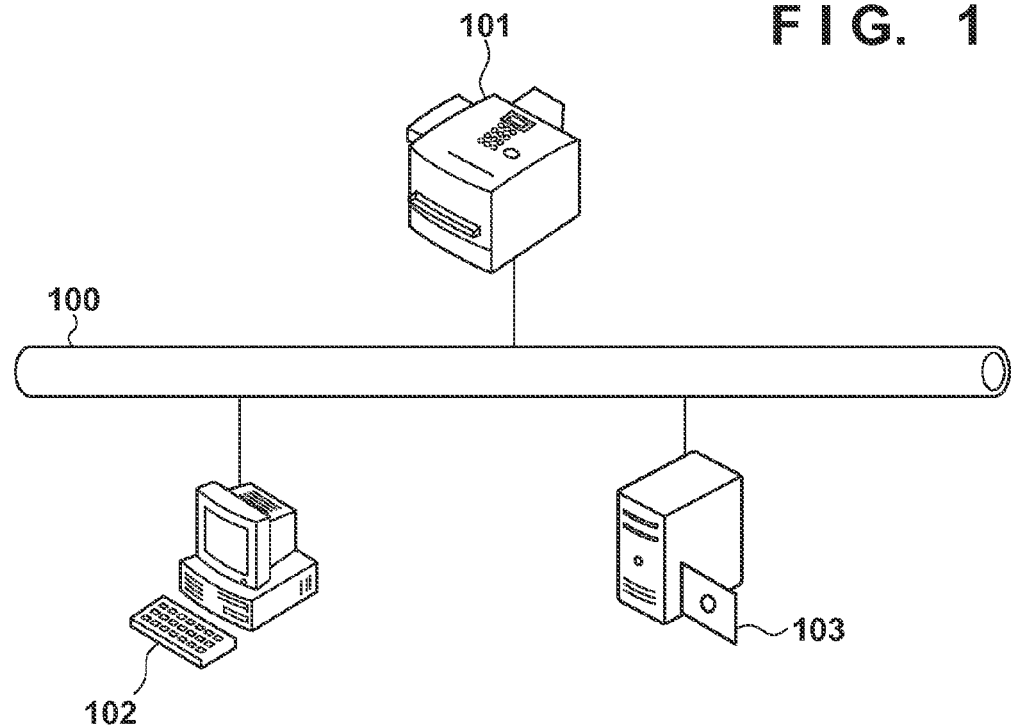
FIG. 1 is a view showing an example of a system arrangement according to the first embodiment.

FIG. 1 is a view showing an example of the arrangement of a printing system including an image forming apparatus to which the present invention is applicable. Note that the present invention is also applicable to even a system which is connected via a network such as a LAN or WAN to perform processing as long as the function of the present invention is executed.

An image forming apparatus 101 is connected to a network 100 via a network interface (not shown). Furthermore, the image forming apparatus 101 analyzes a job containing print data transmitted by an information processing apparatus 102 to convert the data into an image page by page, and prints each page. The image forming apparatus 101 may be any of various printers such as a laser beam printer adopting an electrophotographic method, an inkjet printer adopting an inkjet method, and a printer using a thermal transfer method.

The information processing apparatus 102 is a personal computer, and is connected to the network 100 by a network cable such as an Ethernet® cable. Furthermore, the information processing apparatus 102 can execute various programs such as application programs, and includes a communication apparatus which can bidirectionally communicate with another apparatus connected to the network 100.

A server 103 has the function of a database server or management server, and communicates with a printing apparatus connected to the network 100, thereby performing various processes. The server 103 manages user information, and provides various kinds of information in response to a request from the image forming apparatus 101. The server 103 collects pieces of information (print histories) from a plurality of image forming apparatuses including the image forming apparatus 101 on the network, and manages them. The server 103 sends the managed information in response to a request from the image forming apparatus 101.

Note that the server 103 may be arranged in an internal network, or may provide a service through the Internet. Referring to FIG. 1, the server 103 is shown as one apparatus. The present invention, however, is not limited to this, and the server 103 may be formed from a plurality of apparatuses, and may provide a service to the image forming apparatus 101 and information processing apparatus 102. Note that the user information of the server 103 in FIG. 1 may be held in the image forming apparatus 101.

Figure 2:
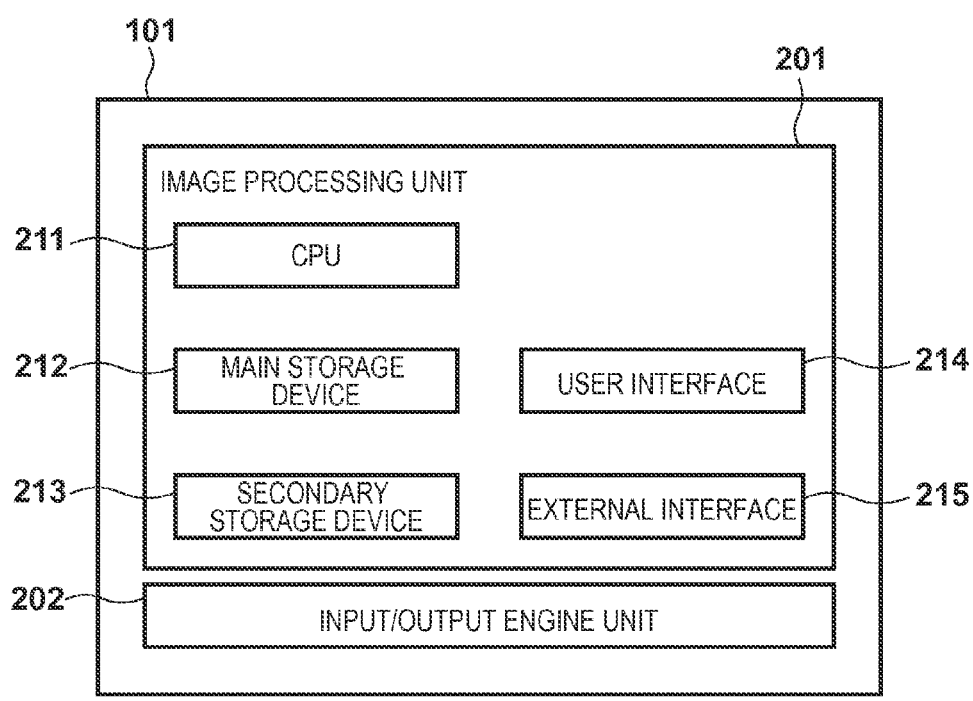
FIG. 2 is a block diagram showing the internal arrangement of an image forming apparatus according to the first embodiment.

An example of the internal arrangement of the image forming apparatus 101 shown in FIG. 1 will be described with reference to FIG. 2. FIG. 2 is a block diagram showing an example of the internal arrangement of the image forming apparatus 101. The image forming apparatus 101 includes an image processing unit 201 and an input/output engine unit 202. The image processing unit 201 includes a CPU 211, a main storage device 212, a secondary storage device 213, a user interface 214, and an external interface 215.

The CPU 211 is a unit which executes a predetermined program and instructs various control operations of the image forming apparatus 101. The main storage device 212 serves as a work memory to be used by the CPU 211 to execute a program. The program to be executed by the CPU 211 is loaded into the main storage device 212. The main storage device 212 is implemented by, for example, a RAM (Random Access Memory). The secondary storage device 213 stores application programs. Various programs stored in the secondary storage device 213 are loaded into the main storage device 212 when executing the programs, and then executed by the CPU 211. The secondary storage device 213 is implemented by, for example, an SSD (Solid State Driver) or HDD (Hard Disc Drive). Note that the CPU 211 may be a multiprocessor.

The input/output engine unit 202 executes a printing operation and image reading operation under the control of the image processing unit 201. As a practical example, the input/output engine unit 202 includes a printer engine for executing printing by a printing method such as a laser beam method, and a scanner engine having a paper feed mechanism such as an ADF (Auto Document Feeder).

Figure 3:
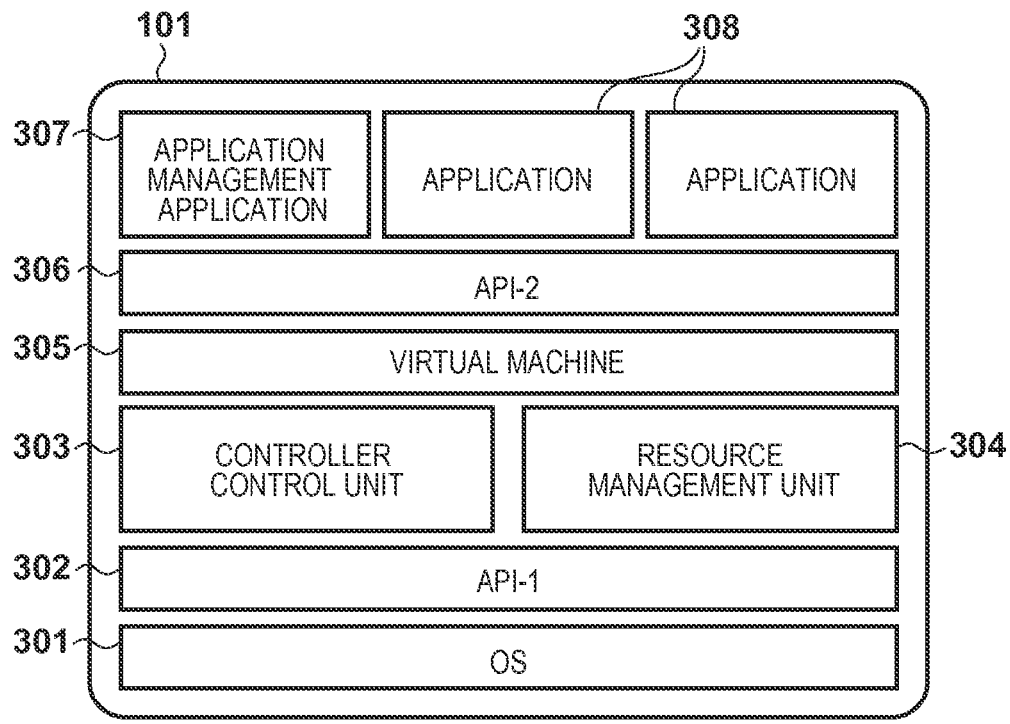
FIG. 3 is a block diagram showing an example of the software arrangement within the image forming apparatus according to the first embodiment.

FIG. 3 is a block diagram showing the software arrangement of the image forming apparatus 101 according to the present invention. The software is stored in the secondary storage device 213, and loaded into the main storage device 212 and then executed upon start of the image forming apparatus 101.

An operating system (OS) 301 manages/controls the resources of the whole image forming apparatus 101. An API-1 302 is an interface for an application running on the OS 301. Through the API-1 302, each application can access the resources of the image forming apparatus 101, and execute a command using the CPU 211. A controller control unit 303 runs on the OS 301, and controls the input/output engine unit 202, user interface 214, external interface 215, and the like. A resource management unit 304 controls resources such as a memory used by the controller control unit 303, a virtual machine 305, and all applications on the virtual machine 305, and restricts the use of resources other than predetermined ones.

The virtual machine 305 is an execution environment optimized to execute a specific application, and is implemented by, for example, a Java® virtual machine. An API-2 306 is an interface which allows an application running on the virtual machine 305 to use the controller control unit 303, resource management unit 304, API-1 302, and the like.

An application management application 307 manages applications 308 running on the virtual machine 305. For example, the application management application 307 downloads, uploads, deletes, and validates/invalidates the application 308. Note that the application management application 307 is also one of applications running on the virtual machine 305. According to roles expected of the image forming apparatus 101, an arbitrary number of applications 308 each having an arbitrary function are installed and operated. The system described in this embodiment implements respective functions by causing the image forming apparatus 101 to implement and operate various applications.

Figure 4:
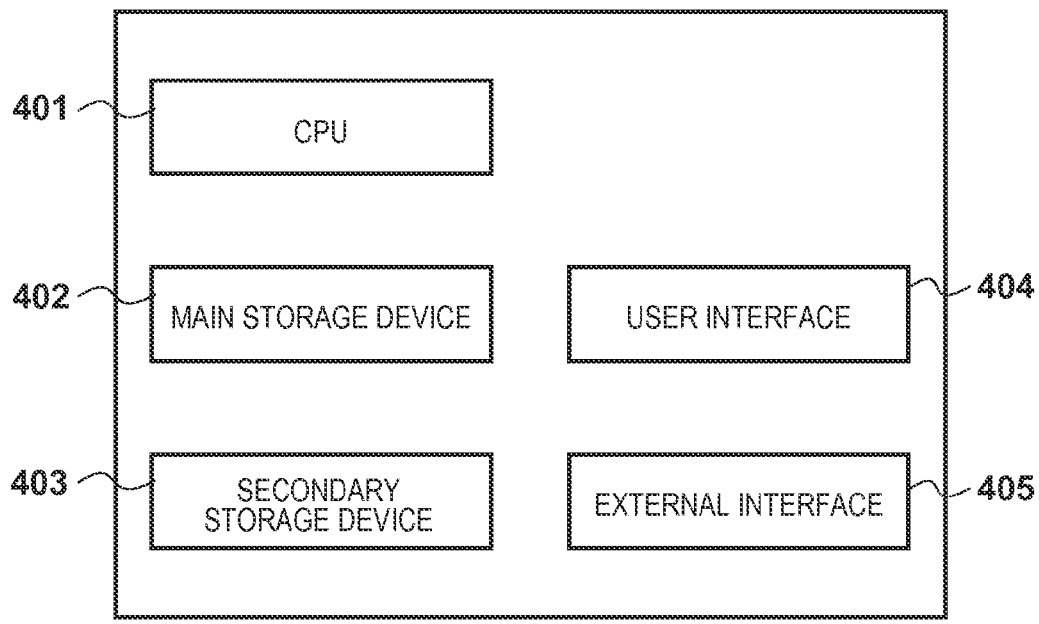
FIG. 4 is a block diagram showing an example of the internal arrangement of an information processing apparatus according to the first embodiment.

An example of the internal arrangement of the information processing apparatus 102 and server 103 shown in FIG. 1 will be described with reference to FIG. 4. The information processing apparatus 102 will be exemplified here. FIG. 4 is a block diagram exemplifying the internal arrangement of the information processing apparatus 102. The information processing apparatus 102 includes a CPU 401, a main storage device 402, a secondary storage device 403, a user interface 404, and an external interface 405.

The CPU 401 is a unit which executes a predetermined program and instructs various control operations of the information processing apparatus 102. The main storage device 402 serves as a work memory to be used when the CPU 401 executes a program. The program to be executed by the CPU 401 is loaded into the main storage device 402. The main storage device 402 is implemented by, for example, a RAM. The secondary storage device 403 stores various programs including application programs and an OS (Operating System). Various programs stored in the secondary storage device 403 are loaded into the main storage device 402 when the CPU 401 executes the programs. The secondary storage device 403 also stores various kinds of data such as print data and document data, details of which will be described later. The secondary storage device 403 is implemented by, for example, a ROM or HDD.

The user interface 404 is used to receive a processing request from the user. For example, the user interface 404 receives a signal corresponding to an instruction which has been input by the user using a keyboard, a mouse, and the like. The external interface 405 is connected to the network 100, thereby enabling communication with an external apparatus connected to the network 100.

Figure 5:
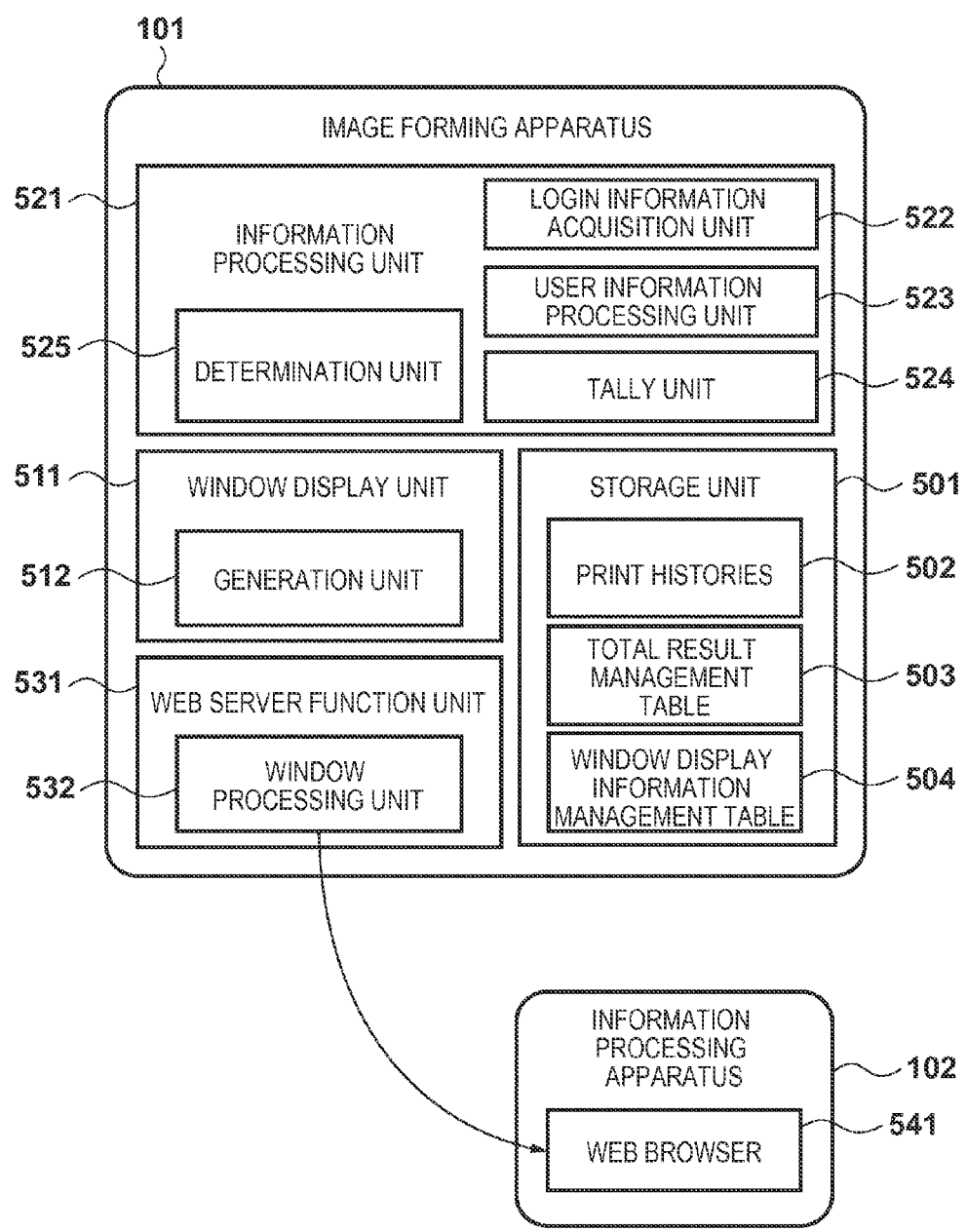
FIG. 5 is a block diagram showing an example of a module arrangement according to the first embodiment.

FIG. 5 is a block diagram showing an example of a main module arrangement which functions as the main body of processing according to this embodiment implemented when the CPU 211 executes a control program. As a main module arrangement, the image forming apparatus 101 includes a storage unit 501, a window display unit 511, an information processing unit 521, and a Web server function unit 531.

The storage unit 501 is a module for performing storage control using the aforementioned secondary storage device 213 and the like, and holds print histories 502, a total result management table 503, and a window display information management table 504. The storage unit 501 may hold pieces of information of a user information management table 700 and group information management table 710 in addition to the print histories 502, total result management table 503, and window display information management table 504. Details of the various tables will be described later. The total result management table 503 records information about the user, and information of the total result of the user and the like. The window display information management table 504 records the setting state of a setting window 900 shown in FIG. 9 (to be described later), and information of display contents.

The window display unit 511 generates a window to be displayed on the local panel (not shown) of the image forming apparatus 101. Each window is generated according to settings made by the administrator, and a window shown in each of FIGS. 10 to 13 and 16 is displayed. A generation unit 512 generates a window using the determination result of a determination unit 525 based on the print histories 502 which store the use state of the user of the image forming apparatus 101.

The information processing unit 521 acquires user information, tallies the print histories, and performs usage performance window display determination processing. The information processing unit 521 includes a login information acquisition unit 522, a user information processing unit 523, a tally unit 524, and a determination unit 525. The login information acquisition unit 522 acquires login information of the user who has logged in to the image forming apparatus 101. The user information processing unit 523 acquires user information from the server 103 based on the login information. The user information includes the user information management table 700 for managing information of a group to which the user belongs, and a group information management table 710 for managing a group to which the user belongs, as shown in FIGS. 7A and 7B. The tally unit 524 acquires the print histories 502 from the image forming apparatus 101 to tally them, and updates the information of the total result management table 503. The determination unit 525 determines whether to display a tally window, based on pieces of information of the total result management table 503 obtained by performing tally by the tally unit 524 and the window display information management table 504 set by the administrator.

Figure 8:
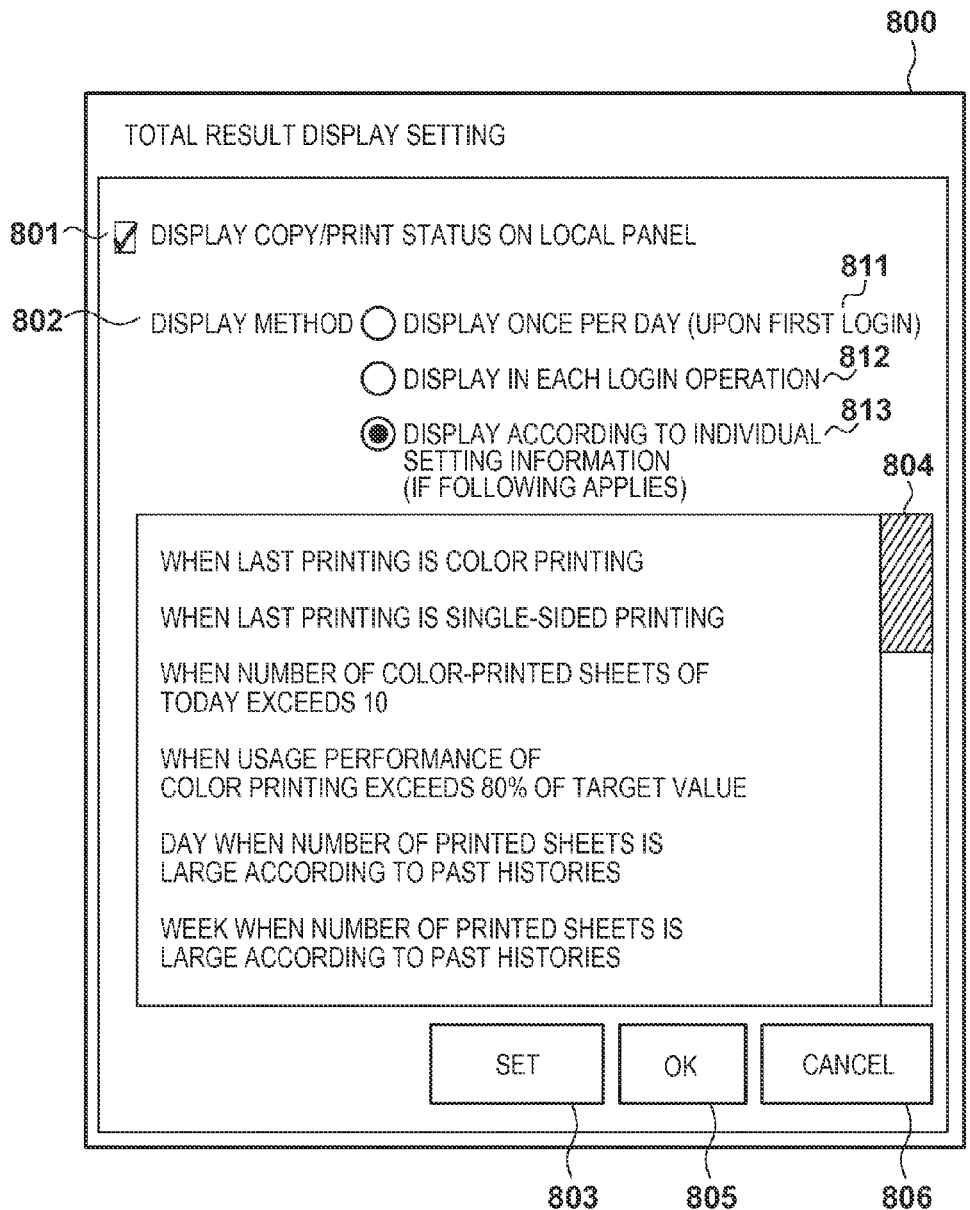
FIG. 8 is a view showing an example of a display setting window 800 according to the first embodiment.
Figure 9:
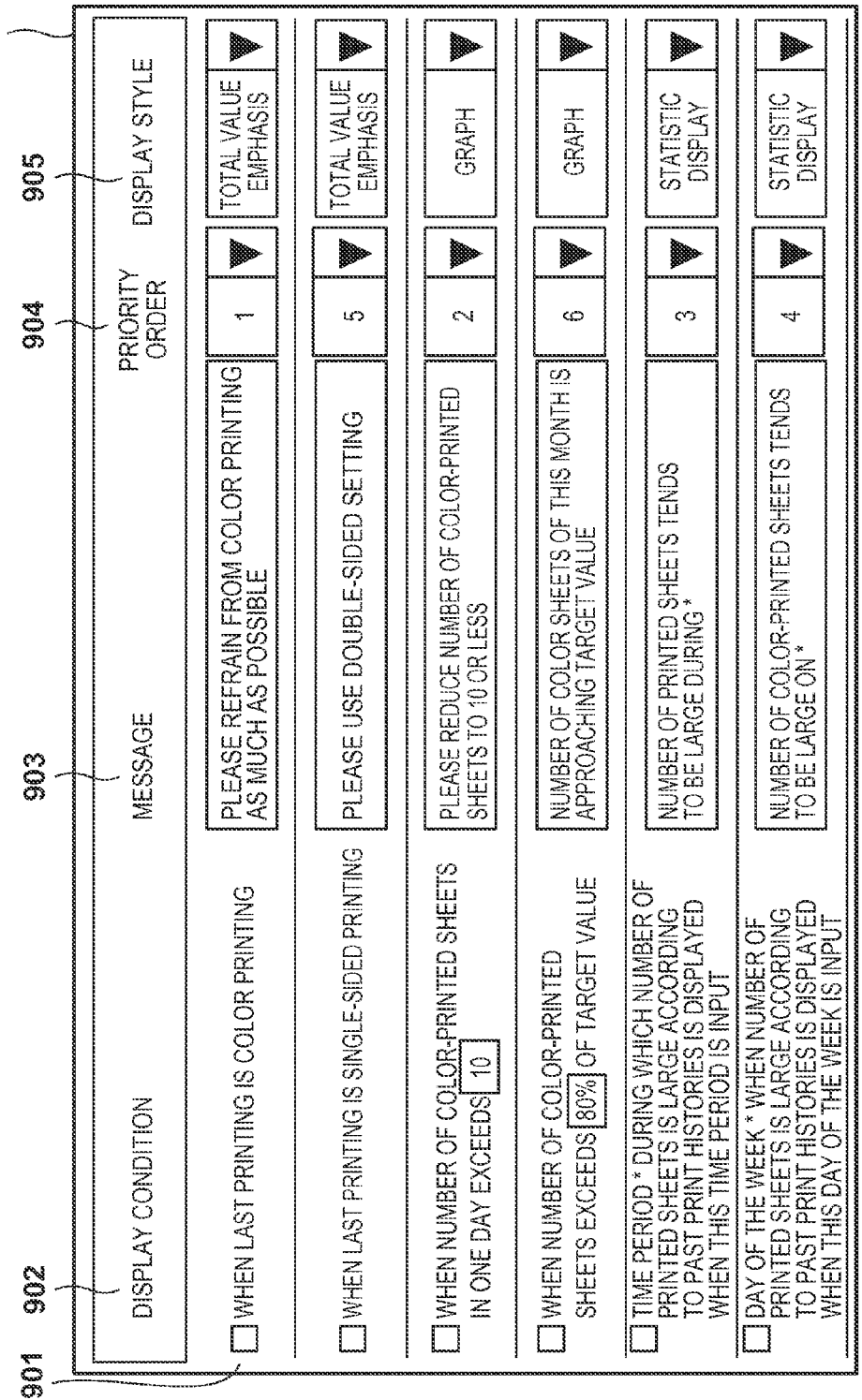
FIG. 9 is a view showing an example of a setting window 900 according to the first embodiment.

The Web server function unit 531 serves as a Web server, and provides various Web pages including a display setting window 800 shown in FIG. 8 and the setting window 900 shown in FIG. 9. A window processing unit 532 presents, to the administrator, the display setting window 800 on a Web browser 541. When the set button of the display setting window 800 is pressed, the window processing unit 532 presents the setting window 900 to the user. The administrator sets a display condition of a tally window through the setting window 900.

The image forming apparatus 101 may periodically transmit the print histories 502 and the total result of the tally unit 524 to the server 103 via the external interface 215.

[Table Structure]

An example of the structure of each of the various tables used in the embodiment will be explained below. Note that more practical application of information included in each table will be described in conjunction of a processing procedure.

FIG. 6A shows an example of the total result management table 503 held in the image forming apparatus 101 according to this embodiment. A user who has used the image forming apparatus 101 is registered in the total result management table 503. In this embodiment, the total result management table 503 holds, in association with each other, respective pieces of information of a user name 601, a tally window display flag 602, a display determination ID 603, an update date/time 604, and total results 605.

The user name 601 indicates the name of a user who has used the image forming apparatus 101 in the past. The tally unit 524 adds a new user if there is no corresponding user in the total result management table 503 when a job is executed in the image forming apparatus 101 and the print histories 502 are tallied. The user name is uniquely defined for each user.

The tally window display flag 602 is information indicating whether to display a tally window. If the value of the tally window display flag 602 is "0", no tally window is displayed. On the other hand, if the value is "1", a tally window is displayed. If it is determined that a tally window for a login user is displayed, the value of the tally window display flag 602 is rewritten by setting information of another user who belongs to the same group as that of the login user. That is, a display history for the tally window of the other user who belongs to the same group is reflected. The value of the tally window display flag 602 may be changed to "0" after a tally window is displayed once or after whether to display a tally window is selected by comparing the update date/time 604 (to be described later) with the current time.

The display determination ID 603 corresponds to a display determination ID 611 for a condition based on which it is determined in tally window display determination processing (step S1102 of FIG. 14) that a tally window is to be displayed. In this embodiment, only the latest display determination ID 603 of the login user is saved. Note that a plurality of display determination IDs 603 may be held, or histories of displayed display determination IDs 603 may be held.

The update date/time 604 is updated when the display determination ID 603 is updated. Each total result 605 indicates a total value for each printing type, which has been obtained by performing tally by the tally unit 524 for each user. For example, printing types as tally items include a combination of settings "color/two-color/monochrome" and "page/number of sheets/amount of money", and ratio information of "color page ratio/double-sided page ratio/N-in-1 page ratio". Information of a printing type other than the aforementioned ones may be held as a total value, as a matter of course.

FIG. 6B shows an example of the window display information management table 504 held in the image forming apparatus 101 according to this embodiment. The window display information management table 504 holds values set through the setting window 900 shown in FIG. 9. In this embodiment, the window display information management table 504 holds, in association with each other, pieces of information of the display determination ID 611, a display determination execution flag 612, a display condition 613, a display message 614, a display priority order 615, and a display style 616.

The display determination ID 611 indicates an ID (identifier) uniquely assigned to each display condition set through the setting window 900. The display determination execution flag 612 is information indicating whether to use, for the tally window display determination processing, the corresponding display condition 613 set through the setting window 900 by the administrator. If the display determination execution flag 612 is "0", the corresponding display condition 613 is not applied to the tally window display determination processing. On the other hand, if the display determination execution flag 612 is "1", the corresponding display condition 613 is applied to the tally window display determination processing.

The display condition 613 indicates a condition under which the tally window display determination processing is performed. If the display condition 613 includes numerical information, the administrator may be able to change the numerical value. The display message 614 is a message displayed on a tally window when the tally window is determined to be displayed in the tally window display determination processing (step S1102 of FIG. 14). The administrator can edit the display message 614.

The display priority order 615 indicates the display priority order of a tally window which has been determined to be displayed in the tally window display determination processing (step S1102). A window to be displayed on the local panel is generated based on the display priority order 615. For example, among tally windows which have been determined to be displayed, a window having a highest display priority order 615 is preferentially displayed immediately after a login operation. Note that among the tally windows which have been determined to be displayed, only a window having a highest priority order may be displayed, or a plurality of windows may be generated, and checked while sequentially transiting to the respective windows according to the priority orders. Assume that for descriptive convenience, the value of the display priority order 615 is set without overlapping any other priority orders.

The display style 616 is information indicating the display style of the tally window, which is set for each display condition 613. In this embodiment, as examples of the display style, emphasized display (FIG. 11), graphic display (FIG. 12), and statistic display (FIG. 13) are shown. The display condition 613 may restrict a selectable type for the display style 616. It may be possible to set another display style according to the characteristics of various data.

FIG. 7A shows an example of the user information management table held in the server 103 according to this embodiment. The user information management table 700 holds information of a group to which each user belongs. In this embodiment, the user information management table 700 holds, in association with each other, pieces of information of a user name 701 and a group name 702. The user name 701 indicates the name of a user managed by the server 103. The user name 701 is uniquely set for each user without overlapping any other user names. The user name 701 corresponds to the user name 601 of FIG. 6A. The group name 702 indicates the name of a group managed by the server 103. The group name 702 is uniquely set for each group without overlapping any other group names.

FIG. 7B shows an example of the group information management table held in the server 103 according to this embodiment. The group information management table 710 holds information about a group. In this embodiment, the group information management table 710 holds, in association with each other, pieces of information of the group name 702 and a member 711. The member 711 holds user names belonging to a corresponding group.

[Setting Window]

FIG. 8 shows an example of the display setting window 800 for setting a total result accessed by the administrator for the Web server function unit 531 of the image forming apparatus 101 according to the embodiment. This implements a receiving unit. The display setting window 800 includes a display checkbox 801, a display frequency radio button 802, a set button 803, a list box 804, an OK button 805, and a cancel button 806.

The display checkbox 801 is used to set whether to display a tally window on the local panel (not shown) of the image forming apparatus 101. If the display checkbox 801 is checked, a tally window is displayed at a display frequency set by the display frequency radio button 802. On the other hand, if the display checkbox 801 is not checked, no tally window is displayed on the local panel.

The display frequency radio button 802 is used to set a frequency at which a tally window is displayed on the local panel. In this embodiment, an item "display once per day (upon first login)" 811, an item "display in each login operation" 812, or an item "display according to individual setting information (if following applies)" 813 is exclusively selectable as a setting item. If the item "display once per day (upon first login)" 811 is selected, a tally window is displayed when the user logs in to the image forming apparatus 101 for the first time on one day. If the item "display in each login operation" 812 is selected, a tally window is displayed every time the user logs in to the image forming apparatus 101. Assume that the item "display according to individual setting information (if following applies)" 813 is selected. In this case, when the user logs in to the image forming apparatus 101, it is determined, based on the display condition set by the administrator, whether to display a tally window, and then the tally window is displayed based on the determination result.

When the set button 803 is pressed, the setting window 900 (FIG. 9) in which the administrator can make settings to more specifically set a tally window display frequency is displayed. The list box 804 displays a list of display conditions set in the setting window 900. When the OK button 805 is pressed, each table is updated based on contents set through the display setting window 800. When the cancel button 806 is pressed, information set through the display setting window 800 is discarded, and the process ends without updating each table.

FIG. 9 shows an example of the setting window 900 for setting display conditions when displaying a total result. The setting window 900 is displayed when the set button 803 of the display setting window 800 is pressed. The setting window 900 displays setting items of a determination checkbox 901, a display condition 902, a message 903, a priority order 904, and a display style 905.

The determination checkbox 901 is used to set whether to use a corresponding display condition as a condition under which a tally window is displayed. If the determination checkbox 901 is checked, a corresponding display condition is used in the tally window display determination processing (step S1102 of FIG. 14). In the display condition 902, a condition under which the tally window display determination processing is executed is described. If the display condition includes a numerical value, the user may directly input a numerical value. The message 903 is a comment displayed when the total result of the user satisfies a corresponding display condition and a tally window is determined to be displayed.

The administrator can edit the message 903. The priority order 904 is information of a priority order for determining, when a plurality of conditions are satisfied, a condition under which a tally window is to be displayed to the user. In this embodiment, the priority order 904 is set not to overlap any other priority orders. The display style 905 is used to select the style of a window to be displayed. In this embodiment, a total value emphasis window (FIG. 11), a graphic window (FIG. 12), or a statistic window (FIG. 13) is selectable. Another type of window display style may be included, and a selectable type may be different depending on a display condition.

The contents set through the setting window shown in FIG. 9 are reflected on the window display information management table 504 shown in FIG. 6B.

[Display Window]

Each of FIGS. 10 to 13 shows an example of a tally window displayed on the operation panel (local panel) of the image forming apparatus 101 according to this embodiment. FIG. 10 shows a default window displayed when the item "display once per day (upon first login)" 811 or the item "display in each login operation" 812 is selected by the display frequency radio button 802 of the display setting window 800. The default window includes a tally period 1001, type-specific total value information 1002, and a close button 1003.

The tally period 1001 displays a period during which print histories are tallied to obtain the print performance. The type-specific total value information 1002 displays a total result for each printing type. Although the type-specific total value information 1002 displays page information about color/two-color/monochrome printing, and ratio information about color page ratio/two-color page ratio/double-sided page ratio/N-in-1 page ratio, the administrator or user may be able to change contents to be displayed. For example, one of "page", "number of printed sheets", and "amount of money" may be selectable using a drop-down list.

Figure 11:
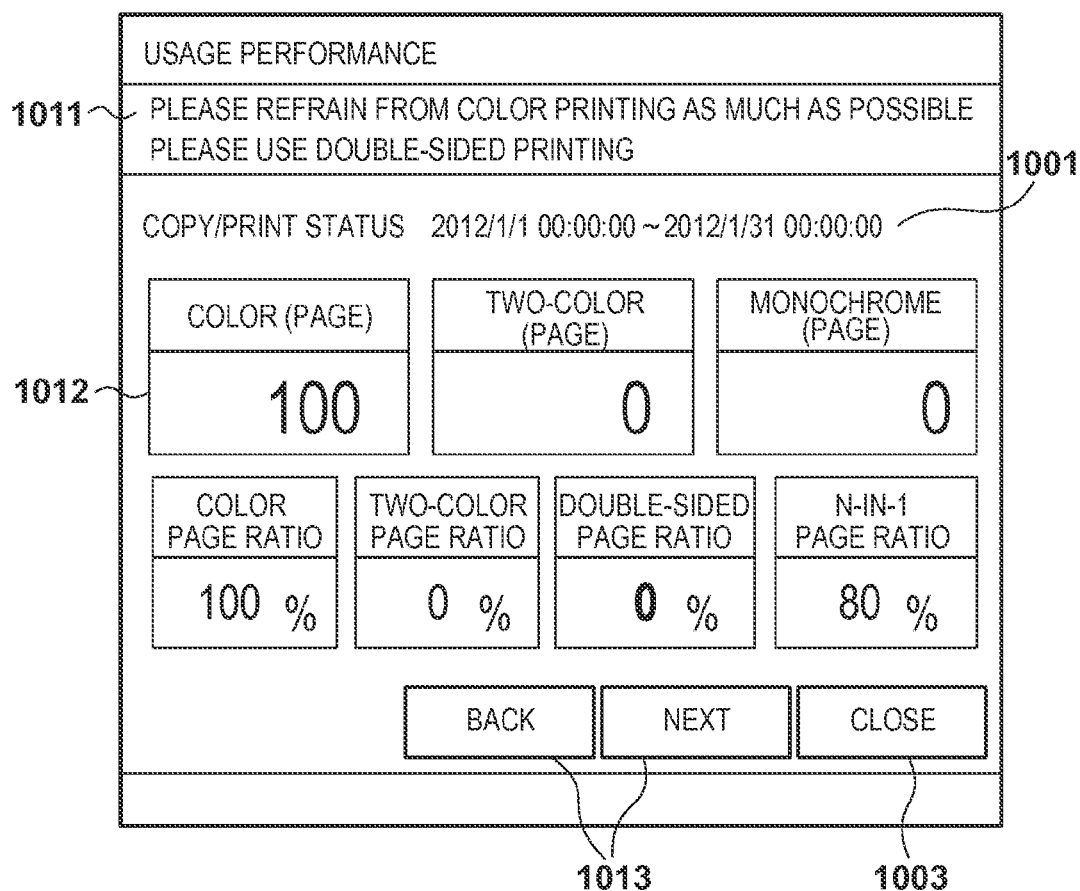
FIG. 11 is a view showing an example of a tally window (emphasized display) according to the first embodiment.

FIG. 11 shows a window displayed when the item "display according to individual setting information (if following applies)" 813 is selected by the display frequency radio button 802 of the display setting window 800, and "total value emphasis" is selected in the display style 905 of the setting window 900. The total value emphasis window shown in FIG. 11 displays a warning message 1011, emphasized display 1012 of the type-specific total value information 1002, and window transition buttons 1013, in addition to the default window shown in FIG. 10.

The warning message 1011 displays a message set in the message 903 of the setting window 900. If there are a plurality of messages to be displayed, the messages are displayed in an order according to their priority orders 904 of the setting window 900. The emphasized display 1012 emphatically displays a total result which causes to display the tally window. As an emphasized display method, any method may be used as long as contents to be focused on are emphasized to be discriminated by the user. For example, the total value is represented by a thick number, an enlarged number, or a red number. If there are a plurality of display conditions 902 to be displayed, the window transits to a next or previous window when the user presses the window transition button 1013, thereby allowing checking of a plurality of pieces of total value information.

Figure 12:
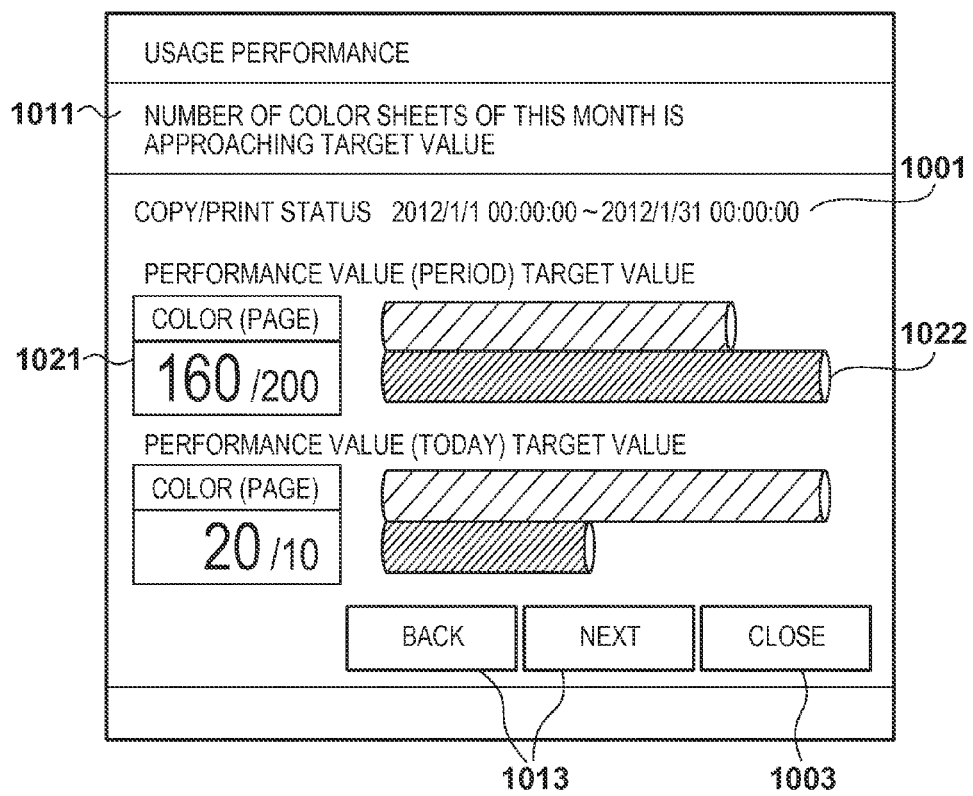
FIG. 12 is a view showing an example of a tally window (tally display) according to the first embodiment.

FIG. 12 shows a window displayed when the item "display according to individual setting information (if following applies)" 813 is selected by the display frequency radio button 802 of the display setting window 800 and "graph" is selected in the display style 905 of the setting window 900. The graphic window shown in FIG. 12 displays the warning message 1011, a corresponding total value 1021, a graph 1022 for the total value, and the window transition buttons 1013.

Figure 13:
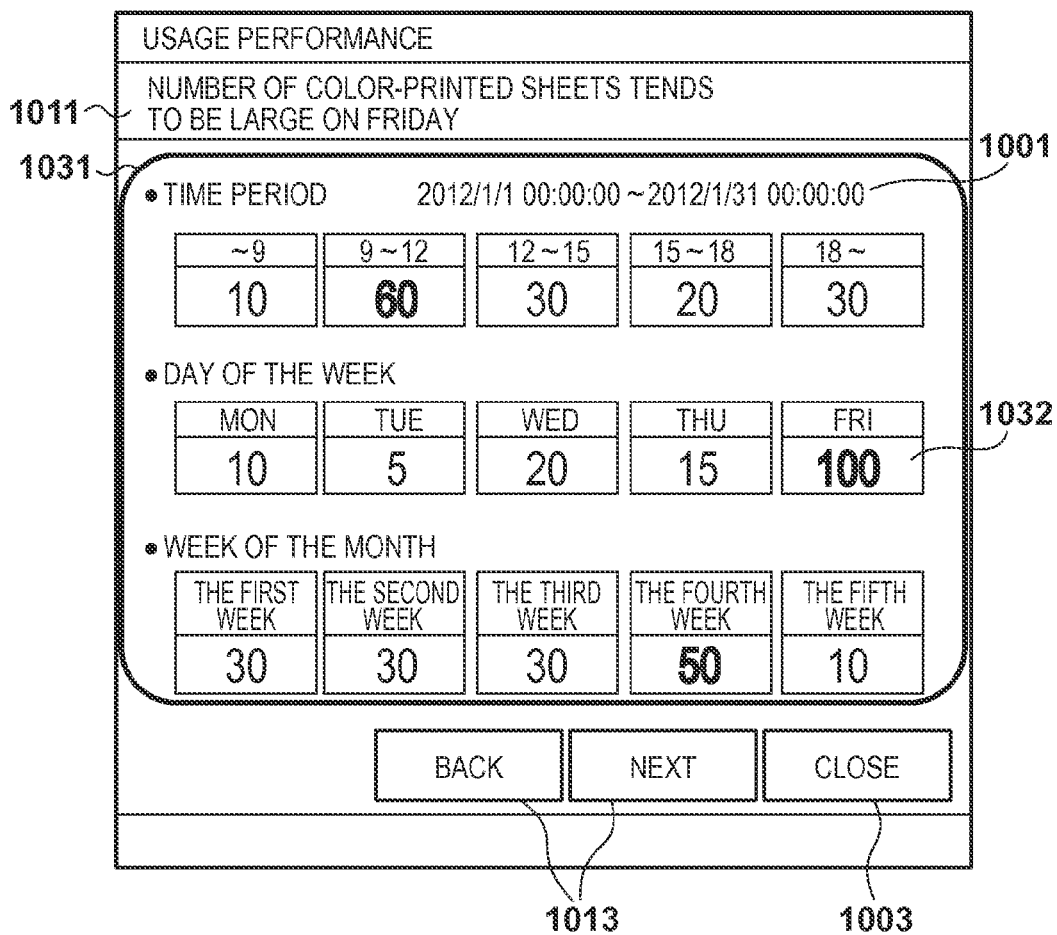
FIG. 13 is a view showing an example of a tally window (statistic display) according to the first embodiment.

FIG. 13 shows a window displayed when the item "display according to individual setting information (if following applies)" 813 is selected by the display frequency radio button 802 of the display setting window 800 and "statistic display" is selected in the display style 905 of the setting window 900. The statistic window shown in FIG. 13 displays the warning message 1011, statistical information 1031, and emphasized display 1032 of the statistical information 1031.

In the statistical information 1031, total results for past time periods, days of the week, and weeks of the month are displayed based on the print histories. The emphasized display 1032 indicates a value corresponding to the largest one of the total results for the time periods, days of the week, or weeks of the month. The emphatically displayed item is to undergo the tally window display determination processing (step S1102 of FIG. 14). Although not shown in the embodiment, when performing the emphasized display 1032, another determination method may be used, for example, if it is determined that a total value exceeds a threshold or exceeds a predetermined percentage of a threshold. An input window or the like may be prepared to enable the administrator to rewrite various thresholds, as a matter of course.

[Processing Procedure]

Figure 14:
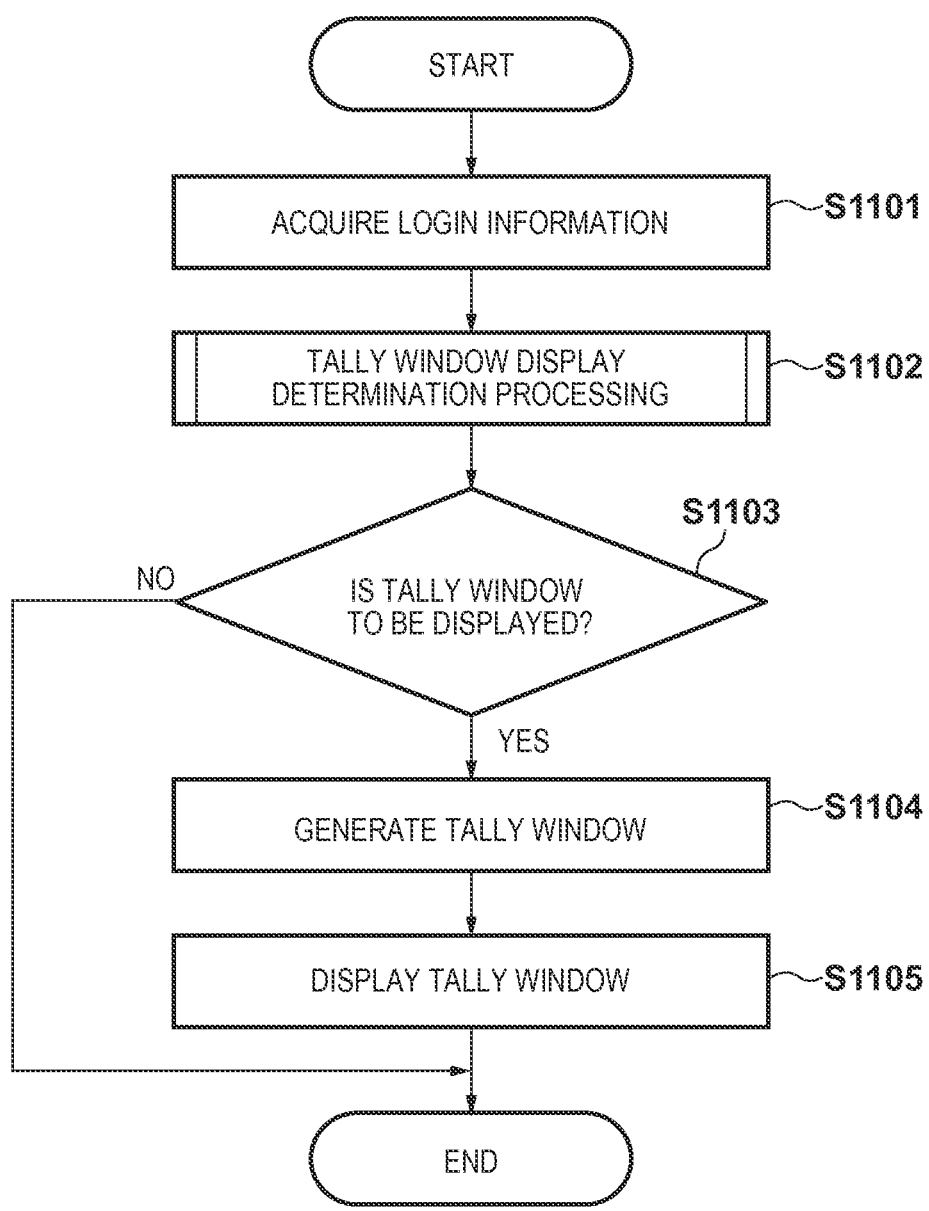
FIG. 14 is a flowchart illustrating processing from a login operation up to display of a tally window according to the first embodiment.

A procedure from when the user logs in to the image forming apparatus 101 until a tally window is displayed on the local panel according to this embodiment will now be described with reference to FIG. 14. In this embodiment, the processing procedure is implemented when the CPU 211 of the image forming apparatus 101 reads out a program stored in a storage unit such as the secondary storage device 403, and executes it.

If the user logs in to the image forming apparatus 101, the image forming apparatus 101 causes the login information acquisition unit 522 to acquire login information such as a user name (step S1101). The image forming apparatus 101 causes the determination unit 525 to determine whether to display a tally window (step S1102). This determination processing will be described in detail later with reference to FIG. 15.

Based on the result of the determination processing, the image forming apparatus 101 determines whether to display a tally window (step S1103). If it is determined that a tally window is not to be displayed (NO in step S1103), the image forming apparatus 101 terminates the processing procedure without displaying a tally window. On the other hand, if it is determined that a tally window is to be displayed (YES in step S1103), the image forming apparatus 101 causes the generation unit 512 to generate a tally window (step S1104). The image forming apparatus 101 then displays the generated tally window on the local panel (step S1105).

Note that the Web server function unit 531 of the image forming apparatus 101 according to the embodiment functions as a Web server, as described above. Therefore, for example, if the user logs in to the image forming apparatus via the Web browser 541 of the information processing apparatus 102 instead of the local panel of the image forming apparatus 101, the tally window may be displayed on the Web browser 541.

(Determination Processing)

The determination processing (step S1102) based on the total result of the user according to this embodiment will now be described with reference to FIG. 15. In this embodiment, in addition to determining based on the total result of the login user whether to display a tally window, a tally window shown in FIG. 16 is displayed if a tally window is displayed to each member of the same group as that of the login user.

The determination unit 525 acquires the total result information of the login user from the total result management table 503 (step S1201). The determination unit 525 then determines whether any of the display conditions 902 in the window display information management table 504, for which the corresponding determination checkboxes 901 are checked, is satisfied (steps S1202 to S1208).

The determination unit 525 first determines whether all the display conditions have been checked (step S1202). If not all the display conditions have been checked (NO in step S1202), the determination unit 525 determines whether the next display condition is satisfied (step S1203). If the display condition is not satisfied (NO in step S1203), the process returns to step S1202, and the determination unit 525 checks again whether all the display conditions have been checked. On the other hand, if the display condition is satisfied (YES in step S1203), the determination unit 525 holds, as information to be used to generate a tally window in step S1104, the display determination ID 603 in, for example, a list on the memory.

The determination unit 525 checks whether the total result management table 503 has been updated at least once in this determination processing (step S1204). If the total result management table 503 has not been updated (NO in step S1204), it is updated (step S1206). On the other hand, if the total result management table 503 has been updated (YES in step S1204), the determination unit 525 compares the display determination ID 603 undergoing the determination processing with that registered in the total result management table 503 (step S1205). If the display determination ID 603 undergoing the determination processing has a higher priority order (NO in step S1205), the determination unit 525 updates the total result management table 503 (step S1206). If the display determination ID 603 undergoing the determination processing has a lower priority order (YES in step S1205), the determination unit 525 returns the process to step S1202 without updating the total result management table 503.

In step S1206, the determination unit 525 updates the tally window display flag 602, display determination ID 603, and update date/time 604 of the total result management table 503 for the login user. The tally window display flag 602, display determination ID 603, and update date/time 604 of the total result management table 503 are used to display group user information 1302 (to be described later).

In step S1207, the determination unit 525 acquires the group information of the login user from the user information management table 700, and then acquires the member information of the group from the group information management table 710 based on the group information. In step S1208, the determination unit 525 updates the information of the tally window display flag 602 of the total result management table 503 of each member acquired in step S1207.

If all the display conditions have been checked (YES in step S1202), the determination unit 525 checks the value of the tally window display flag 602 (step S1209). In step S1209, the determination unit 525 determines whether to generate a tally window, as shown in FIG. 16 described above, which is to be displayed by a user other than the login user. If the value of the tally window display flag 602 is "0" (NO in step S1209), the processing procedure ends.

If the value of the tally window display flag 602 is "1" (YES in step S1209), the determination unit 525 acquires the group information of the login user from the user information management table 700 managed by the server 103. Based on the group information, the determination unit 525 acquires the member information of the group from the group information management table 710 managed by the server 103 (step S1210). Based on the member information acquired in step S1210, the determination unit 525 acquires the display determination ID 603 and update date/time 604 of each member (step S1211). The determination unit 525 holds, as information to be used to generate a tally window in step S1104, the acquired information in, for example, a list on the memory.

[Tally Window]

FIG. 16 shows an example of a tally window displayed on the local panel of the image forming apparatus 101 according to this embodiment.

Figure 15:
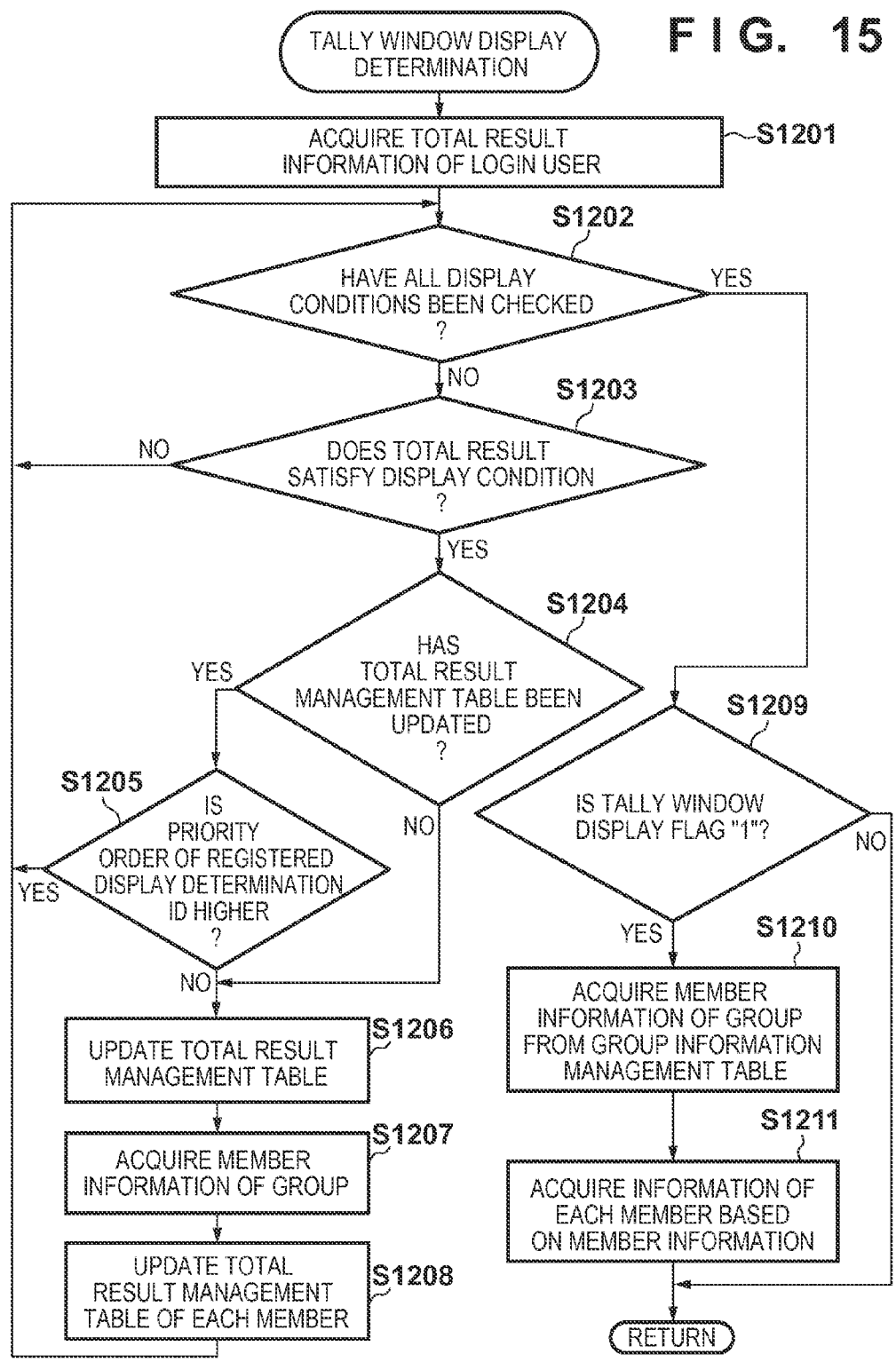
FIG. 15 is a flowchart illustrating tally window display determination processing according to the first embodiment.
Figure 16:
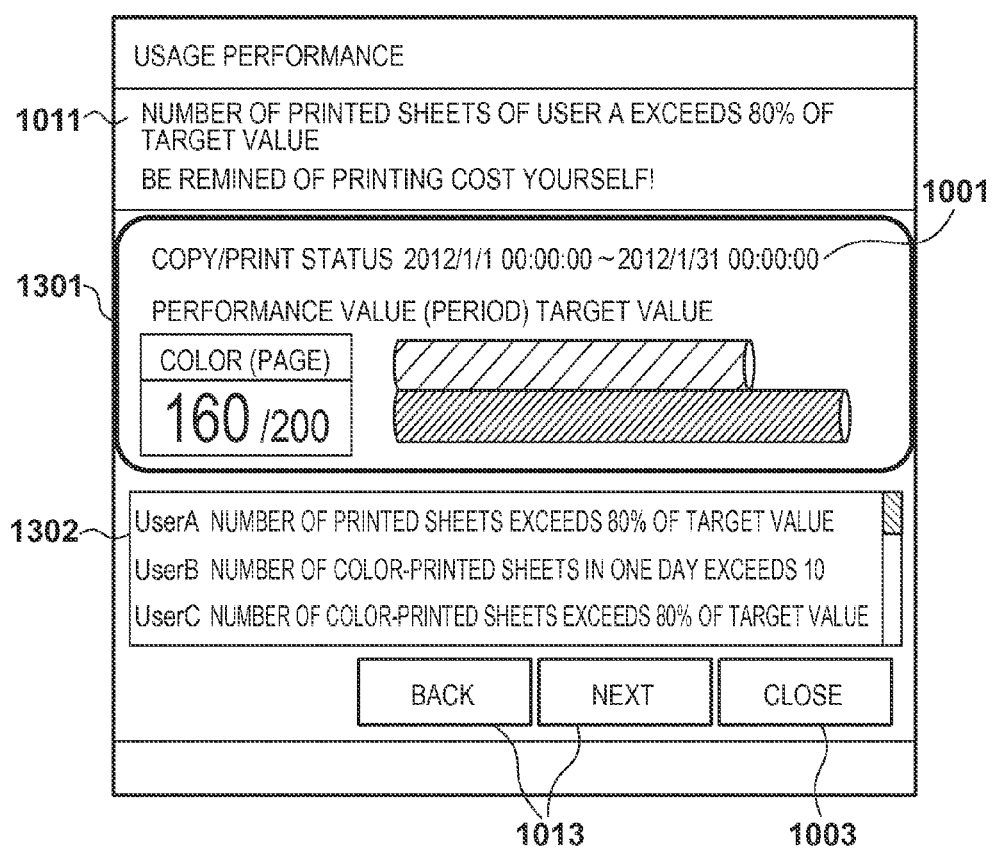
FIG. 16 is a view showing an example of a tally window (group notification) according to the first embodiment.

FIG. 16 shows a window displayed when it is determined in step S1209 of FIG. 15 that the tally window display flag is "1". The tally window displays the warning message 1011, tally information 1301, group user information 1302, and the window transition buttons 1013. In a portion where the tally information 1301 is shown, information about the display condition of the user recently determined to be displayed is displayed. Note that the user recently determined to be displayed indicates a user having a latest update date/time 604 among users for which the display determination IDs 603 are described.

The group user information 1302 displays the user names of the users, among the group users, for which the display determination IDs 603 are described, and information corresponding to the described display determination IDs 603. The information corresponding to the display determination IDs 603 may be the display condition 902, the message 903, or comment information prepared for the window shown in FIG. 16.

Second Embodiment

In the first embodiment, display of a tally window is determined based on the print histories. A warning window may be displayed to the login user using information indicating the number of times a tally window has been successively displayed. In the second embodiment, a warning display is displayed when a tally window is repeatedly displayed. In the second embodiment, only the differences from the first embodiment will be explained for descriptive convenience.

[Setting Window]

FIG. 17 shows an example of a setting window 1400 according to the second embodiment. Only the differences from FIG. 9 will be described. When a set button 803 of a display setting window 800 is pressed, the setting window 1400 is displayed. The setting window 1400 includes a warning window display checkbox 1401 and a display count setting item 1402. The warning window display checkbox 1401 is used to set whether to give a warning when a tally window is successively displayed. The display count setting item 1402 is used to set the number of times a tally window has been successively displayed when the warning window is displayed.

FIG. 18 shows an example of the warning window displayed when the warning window display checkbox 1401 is checked and a tally window is successively displayed the number of times set in the display count setting item 1402 according to the second embodiment. The warning window includes a warning message 1501 and a close button 1502.

The warning message 1501 is a message for warning the user to be reminded of print settings. The administrator may set the display contents of the warning message 1501 through the display setting window 800. If the close button 1502 is pressed, the window transits to the tally window.

[Processing Procedure]

Figure 19:
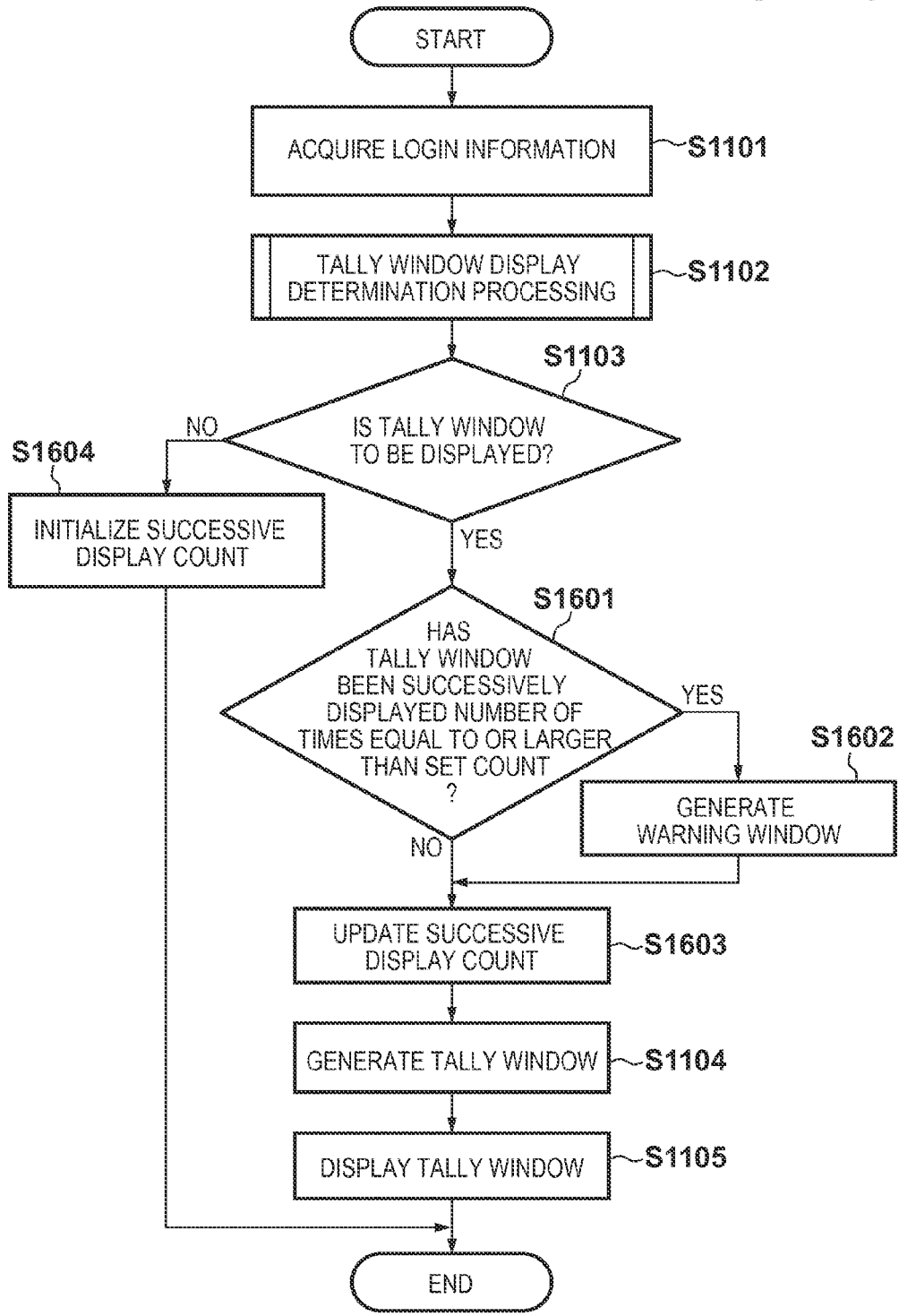
FIG. 19 is a flowchart illustrating warning window display processing according to the second embodiment.

A procedure from when the user logs in to an image forming apparatus 101 until a tally window is displayed on a local panel according to the second embodiment will be described with reference to FIG. 19. In this embodiment, only the differences from FIG. 14 will be described. In this embodiment, the processing procedure is implemented when a CPU 211 of the image forming apparatus 101 reads out a program stored in a storage unit such as a secondary storage device 403, and executes it.

If it is determined that a tally window is to be displayed (YES in step S1103), the image forming apparatus 101 determines whether a tally window has been successively displayed the number of times equal to or larger than a count set in the display count setting item 1402 shown in FIG. 17 (step S1601). Assume that the successive display count of a total result is held in a total result management table (not shown). If it is determined that the tally window has not been displayed the number of times equal to or larger than the set count (NO in step S1601), the image forming apparatus 101 updates the successive display count information (step S1603). On the other hand, if it is determined that the tally window has been displayed the number of times equal to or larger than the set count (YES in step S1601), the image forming apparatus 101 generates a warning window as shown in FIG. 18 (step S1602). After that, the image forming apparatus 101 counts the successive display count in the total result management table, and updates the information (step S1603).

Alternatively, if it is determined that a tally window is not to be displayed (NO in step S1103), the image forming apparatus 101 initializes the value of the successive display count (step S1604).

Note that the value of the successive display count may be initialized when a predetermined time elapses since a tally window was displayed last.

Other Embodiments

In the above-described embodiments, a case in which a tally window is displayed on a local panel based on the total result of the print histories has been explained. As another method of notifying a user of the total result, if it is determined that a tally window is to be displayed, a mail function may be used to send a notification to a destination set by an administrator. In this case, the image forming apparatus may have a mail function to transmit a mail message, or a mail server may be additionally provided to send a notification. Furthermore, when sending a notification, a notification destination may be changed according to a use state or a corresponding condition. In combination of the aforementioned embodiments, the notification destination may be displayed on the tally window together with the total result.

In the above-described embodiments, the tally unit 524 and total result management table 503 are arranged on the image forming apparatus 101 side to tally the print histories. However, the tally unit may be provided on the server side, thereby causing the server to function as a tally server. In this case, the image forming apparatus acquires a total result from the server, and holds it in a total result management table. After that, the determination unit 525 determines whether to display a tally window.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222542, filed Oct. 4, 2012, which is hereby incorporated by reference herein in its entirety.

What is claimed is:

1. An image forming apparatus for displaying a tally window of print histories, comprising:
   a tally unit configured to tally the print histories;
   a receiving unit configured to receive a condition used to determine whether to display the tally window, and a setting corresponding to the condition and used to generate the tally window;
   a determination unit configured to determine, based on a total result by the tally unit and the condition received by the receiving unit, whether to display the tally window;
   a generation unit configured to, if the determination unit determines that the tally window is to be displayed because the condition received by the receiving unit is satisfied, generate the tally window using the setting corresponding to the condition;
   a display unit configured to display the tally window generated by the generation unit;
   a count unit configured to count a number of times the determination unit determines display of the tally window; and
   a warning unit configured to, if the number of times exceeds a predetermined threshold, display a warning window.

2. The apparatus according to claim 1, wherein the tally unit tallies the print histories for each user.

3. The apparatus according to claim 2, further comprising an acquisition unit configured to acquire information of a group to which a user belongs and information of another user belonging to the same group,
   wherein the generation unit reflects a total result of print histories of the another user belonging to the same group on the tally window of the user.

4. The apparatus according to claim 3, wherein based on a display history of the tally window for the another user belonging to the same group, the generation unit reflects the total result of the print histories of the another user on the tally window of the user.

5. The apparatus according to claim 1, wherein:
   the receiving unit receives a plurality of conditions, and priority orders of the plurality of conditions,
   if the determination unit determines that the tally window is to be displayed because a total result satisfies the plurality of conditions, the generation unit generates a plurality of tally windows using settings respectively corresponding to the plurality of conditions, and
   the display unit displays the plurality of tally windows according to the priority orders.

6. The apparatus according to claim 1, wherein the receiving unit receives, as a setting corresponding to the condition, at least one of a display style of the total result and a message to be displayed on the tally window.

7. The apparatus according to claim 1, further comprising a notification unit configured to, if the determination unit determines that the tally window is to be displayed, send a notification of the total result using a mail function.

8. The apparatus according to claim 1, wherein the image forming apparatus is connected to a server for managing at least one of print history information, user information, and group information, and acquires one of the pieces of information from the server.

9. A control method for an image forming apparatus which displays a tally window of print histories, comprising:
   tallying the print histories;
   receiving step of receiving a condition used to determine whether to display the tally window, and a setting corresponding to the received condition and used to generate the tally window;
   determining, based on a total result in the tallying step and the received condition, whether to display the tally window;
   if it is determined that the tally window is to be displayed because the received condition is satisfied, generating the tally window using the setting corresponding to the received condition;
   displaying the generated tally window;
   counting a number of times it is determined that the tally window is to be displayed; and
   if the number of times exceeds a predetermined threshold, displaying a warning window.

10. A non-transitory computer-readable medium storing a program for causing a computer to function as:
    a tally unit configured to tally print histories;
    a receiving unit configured to receive a condition used to determine whether to display a tally window, and a setting corresponding to the condition and used to generate the tally window;
    a determination unit configured to determine, based on a total result by the tally unit and the condition received by the receiving unit, whether to display the tally window;
    a generation unit configured to, if the determination unit determines that the tally window is to be displayed because the condition received by the receiving unit is satisfied, generate the tally window using the setting corresponding to the condition;
    a display unit configured to display the tally window generated by the generation unit;
    a count unit configured to count a number of times the determination unit determines display of the tally window; and
    a warning unit configured to, if the number of times exceeds a predetermined threshold, display a warning window.

11. A printing system including an image forming apparatus and a tally server,
    the tally server comprising a tally unit configured to tally print histories in the image forming apparatus, and
    the image forming apparatus comprising:
      a receiving unit configured to receive a plurality of conditions each used to determine whether to display a tally window, priority orders of the plurality of conditions, and settings respectively corresponding to the plurality of conditions and each used to generate the tally window; an acquisition unit configured to acquire a total result of the print histories from the tally server;
      a determination unit configured to determine, based on the total result acquired by the acquisition unit and the plurality of conditions received by the receiving unit, whether to display the tally window;
      a generation unit configured to, if the determination unit determines that a plurality of tally windows are to be displayed because the plurality of received conditions are satisfied, generate the plurality of tally windows using the settings respectively corresponding to the plurality of conditions; and
      a display unit configured to display the plurality of tally windows generated by the generation unit according to the priority orders.

* * * * *